(12) United States Patent
Yu et al.

(10) Patent No.: US 10,509,261 B2
(45) Date of Patent: Dec. 17, 2019

(54) REFLECTIVE LIQUID CRYSTAL DISPLAY PANEL

(71) Applicant: HannStar Display Corporation, Taipei (TW)

(72) Inventors: Ming-Chang Yu, Taichung (TW); Cheng-Yen Yeh, Taichung (TW); Chen-Hao Su, Taichung (TW)

(73) Assignee: HannStar Display Corporation, Taipei (TW)

( * ) Notice: Subject to any disclaimer, the term of this patent is extended or adjusted under 35 U.S.C. 154(b) by 47 days.

(21) Appl. No.: 15/494,550

(22) Filed: Apr. 24, 2017

(65) Prior Publication Data

US 2018/0188601 A1    Jul. 5, 2018

(30) Foreign Application Priority Data

Dec. 29, 2016    (CN) .......................... 2016 1 1244038

(51) Int. Cl.
*G02F 1/1335*    (2006.01)

(52) U.S. Cl.
CPC .... *G02F 1/133553* (2013.01); *G02F 2203/30* (2013.01)

(58) Field of Classification Search
CPC ................................................ G02F 1/133553
See application file for complete search history.

(56) References Cited

U.S. PATENT DOCUMENTS

| 5,208,689 | A | * | 5/1993 | Hartmann | ............ | G09G 3/3607 345/97 |
| 5,404,236 | A | * | 4/1995 | Hartmann | ......... | G02F 1/134336 345/695 |
| 5,751,272 | A | * | 5/1998 | Silverbrook | ...... | G02F 1/133514 345/694 |
| 6,094,187 | A | | 7/2000 | Jones et al. | | |
| 2002/0047822 | A1 | * | 4/2002 | Senda | ....................... | G09G 3/32 345/90 |
| 2002/0075211 | A1 | * | 6/2002 | Nakamura | ........... | G09G 3/3618 345/87 |
| 2002/0196208 | A1 | * | 12/2002 | Nanno | ................. | G09G 3/3655 345/55 |
| 2006/0055713 | A1 | * | 3/2006 | Asao | ................. | G02F 1/133514 345/690 |

* cited by examiner

*Primary Examiner* — Sang V Nguyen
(74) *Attorney, Agent, or Firm* — JCIPRNET

(57) ABSTRACT

A reflective liquid crystal display panel including a plurality of pixel units is provided. Each pixel unit includes first and second substrates, one first signal line, four second signal lines, a liquid crystal layer, a first pixel structure, a second pixel structure, a third pixel structure and a fourth pixel structure. The first and second signal lines are disposed on the first substrate. The first, second, third, and fourth pixel structures are electrically connected to one of the four second signal lines respectively and electrically connected to the first signal line, where the first, second, third, and fourth pixel structures respectively include an active component and a reflective pixel electrode electrically connected to the active component, and a reflection area ratio of the first, second, third, and fourth pixel structures is one of 1:2:4:8 and 2:1:4:8. The second substrate is located opposite to the first substrate. The liquid crystal layer is disposed between the first substrate and the second substrate. The display panel displays 16 gray scales to achieve good visual effect.

7 Claims, 10 Drawing Sheets

1

REFLECTIVE LIQUID CRYSTAL DISPLAY PANEL

CROSS-REFERENCE TO RELATED APPLICATION

This application claims the priority benefit of Chinese patent application serial no. 201611244038.9, filed on Dec. 29, 2016. The entirety of the above-mentioned patent application is hereby incorporated by reference herein and made a part of the specification.

BACKGROUND OF THE INVENTION

Field of the Invention

The invention relates to a liquid crystal display panel, and particularly relates to a reflective liquid crystal display panel.

Description of Related Art

In recent years, E-papers and E-books are quickly developed. Under the needs of low power consumption, the E-papers and the E-books generally adopt a reflective display device to display images, where an adopted display medium includes liquid crystal, electrophoretic display medium, electrochromic display medium, electrolytic precipitation display medium, etc., and a reflective liquid crystal display with liquid crystal draws extensive attention. Generally, if only a text is displayed, two gray scales of black and white are enough, though if a color graded image is displayed while considering the low power consumption, the two gray scales of black and white are not enough. Presently, the reflective liquid crystal display still has a problem of inadequate number of gray scales that causes a poor visual effect, so that it is one of the targets to be achieved by related researchers to expand the number of gray scales.

SUMMARY OF THE INVENTION

The invention is directed to a reflective liquid crystal display panel, which is adapted to display 16 gray scale levels, so as to achieve a good visual effect.

The invention provides a reflective liquid crystal display panel having a display area and a periphery area surrounding the display area, and including a plurality of pixel units disposed in the display area, where each of the pixel units includes a first substrate, one first signal line, four second signal lines, a first pixel structure, a second pixel structure, a third pixel structure, a fourth pixel structure, a second substrate, and a liquid crystal layer. The one first signal line and the four second signal lines are disposed on the first substrate. The first pixel structure, the second pixel structure, the third pixel structure and the fourth pixel structure are electrically connected to one of the four second signal lines respectively and are electrically connected to the first signal line, where the first pixel structure, the second pixel structure, the third pixel structure and the fourth pixel structure respectively include an active component and a reflective pixel electrode electrically connected to the active component, and a reflection area ratio of the first pixel structure, the second pixel structure, the third pixel structure and the fourth pixel structure is one of 1:2:4:8 and 2:1:4:8. The second substrate is located opposite to the first substrate. The liquid crystal layer is disposed between the first substrate and the second substrate.

According to the above description, each of the pixel units includes the first pixel structure, the second pixel structure, the third pixel structure and the fourth pixel structure with the reflection area ratio of one of 1:2:4:8 and 2:1:4:8, and the first pixel structure, the second pixel structure, the third pixel structure and the fourth pixel structure are electrically connected to one of the four second signal lines respectively and are electrically connected to the first signal line. The reflective liquid crystal display panel of the invention has a novel structure, and is adapted to display 16 gray scale levels to achieve a good visual effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
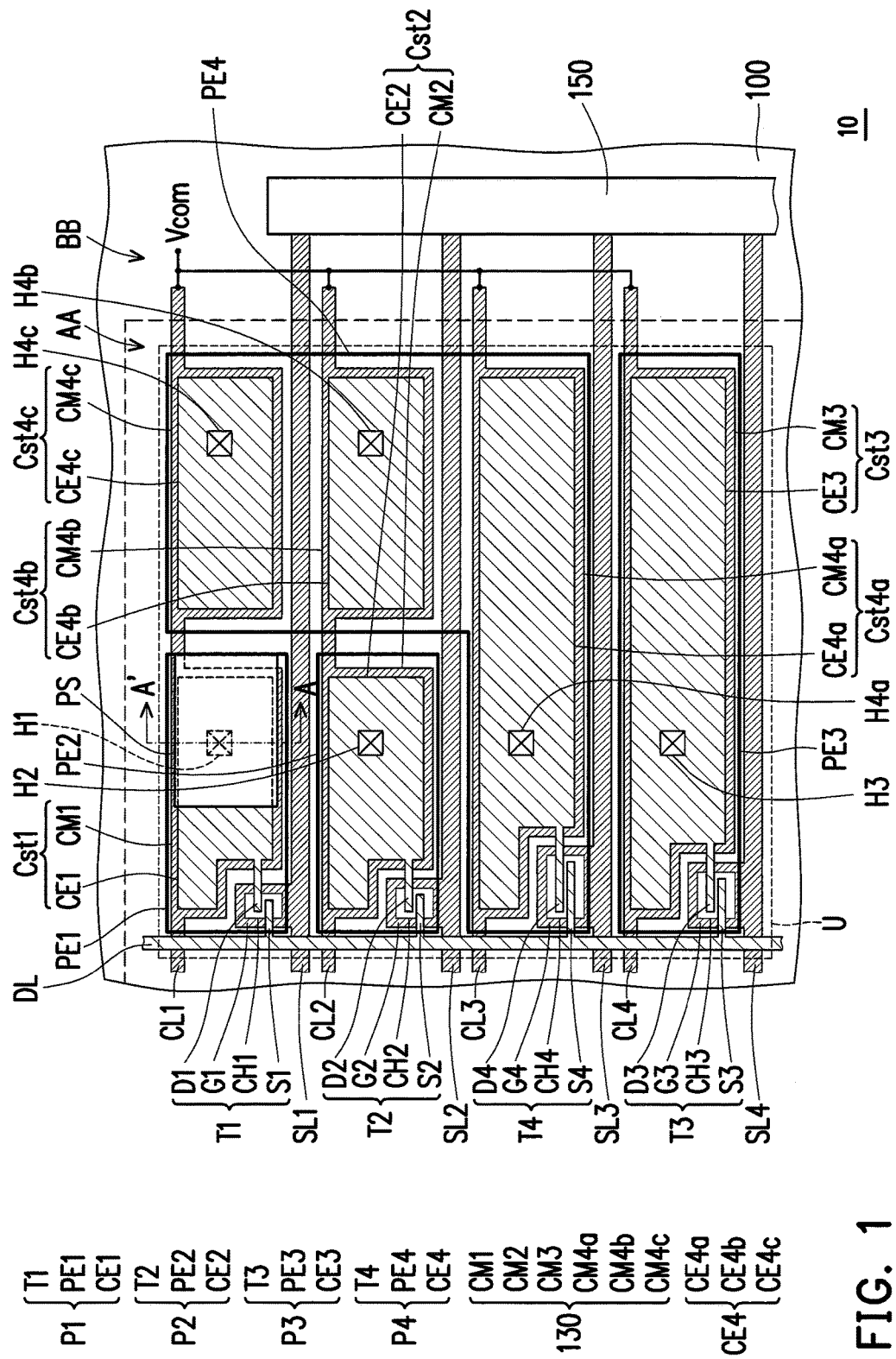
FIG. 1 is a top view of a reflective liquid crystal display panel according to a first embodiment of the invention.
Figure 2:
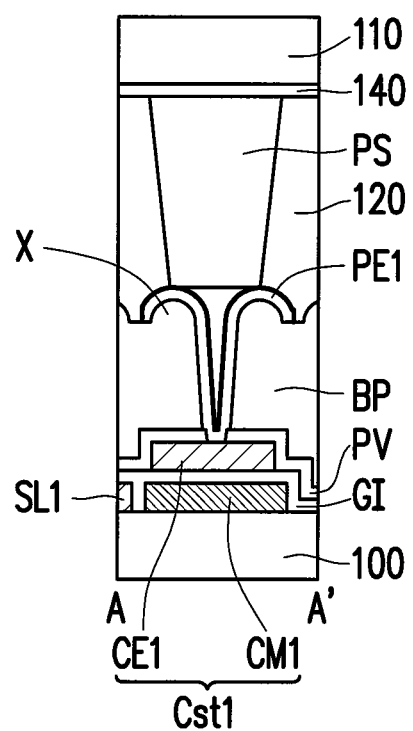
FIG. 2 is a cross-sectional view along a section line A-A' of FIG. 1.

FIG. 1 is a top view of a reflective liquid crystal display panel according to a first embodiment of the invention. FIG. 2 is a cross-sectional view along a section line A-A' of FIG. 1.

Referring to FIG. 1 and FIG. 2, the reflective liquid crystal display panel 10 has a display area AA and a periphery area BB outside the display area AA. In the present embodiment, the periphery area BB, for example, surrounds the display area AA. The reflective liquid crystal display panel 10 includes a plurality of pixel units U disposed in the display area AA. In detail, each of the pixel units U includes a first substrate 100, one first signal line, four second signal lines, a first pixel structure P1, a second pixel structure P2, a third pixel structure P3, a fourth pixel structure P4, a second substrate 110, and a liquid crystal layer 120. In the present embodiment, the first signal line is exemplified by a data line DL, and the four second signal lines are exemplified by a first scan line SL1, a second scan line SL2, a third scan line SL3 and a fourth scan line SL4. Moreover, in the present embodiment, the pixel unit U further includes a common electrode layer 130, an insulation layer PV, a cover layer BP, a counter electrode layer 140 and a spacer PS. Moreover, in the present embodiment, the reflective liquid crystal display panel 10 further includes a thin-film transistor integrated gate driver 150 disposed in the periphery area BB. For simplicity's sake, only one pixel unit U is illustrated in FIG. 1, though the reflective liquid crystal display panel 10 is actually composed of a plurality of pixel units U arranged in an array, and the second substrate 120, the counter electrode layer 140, the liquid crystal layer 120, the cover layer BP, the insulation layer PV and the gate insulation layer GI, etc., are omitted in FIG. 1.

In the present embodiment, an operation mode of the reflective liquid crystal display panel 10 is, for example, an electrically controlled birefringence (EBC) mode, a vertical alignment (VA) mode, a twist nematic (TN) mode, an in plane switch (IPS) mode, a fringe field switch (FFS) mode, an optical compensation bend (OCB) mode. Therefore, the reflective liquid crystal display panel 10 of the present embodiment is not limited to FIG. 1 and FIG. 2, and those skilled in the art should understand that the reflective liquid crystal display panel 10 can be further configured with other required components, such as an alignment film, a polarizing plate.

Moreover, in the present embodiment, the scanning frequency of the reflective liquid crystal display panel 10 is higher than 0 and less than or equal to 20 Hz, and is preferably 1 Hz to 15 Hz. Namely, the reflective liquid crystal display panel 10 is adapted to implement low-frequency operations to achieve a power-saving effect.

The material of the first substrate 100 can be glass, quartz or organic polymer. The second substrate 110 is located opposite to the first substrate 100. The material of the second substrate 110 can be glass, quartz or organic polymer.

The liquid crystal layer 120 is disposed between the first substrate 100 and the second substrate 110. In detail, the liquid crystal layer 120 includes a plurality of liquid crystal molecules (not shown), and proper liquid crystal molecules are selected according to different operation modes.

The counter electrode layer 140 is disposed on the second substrate 110, and is located between the second substrate 110 and the liquid crystal layer 120. The material of the counter electrode layer 140 is, for example, a high transmittance material such as indium-tin oxide, indium-zinc oxide, aluminium-tin oxide, aluminium-zinc oxide or a combination thereof. Moreover, in the present embodiment, the liquid crystal molecules in the liquid crystal layer 120 are driven by an electric field between pixel structures and the counter electrode layer 140.

The first scan line SL1, the second scan line SL2, the third scan line SL3, the fourth scan line SL4, the data line DL are disposed on the first substrate 100. The extending direction of the first scan line SL1, the second scan line SL2, the third scan line SL3 and the fourth scan line SL4 is different from the extending direction of the data line DL, and preferably the extending direction of the first scan line SL1, the second scan line SL2, the third scan line SL3 and the fourth scan line SL4 is perpendicular to the extending direction of the data line DL.

Moreover, the first scan line SL1, the second scan line SL2, the third scan line SL3 and the fourth scan line SL4 are located in one layer, and the data line DL is located in another layer. The gate insulation layer GI is located between the four scan lines (SL1, SL2, SL3, SL4) and the data line DL, which will be described in detail below. Considering conductivity, the first scan line SL1, the second scan line SL2, the third scan line SL3, the fourth scan line SL4 and the data line DL are generally made of metal. However, the invention is not limited thereto, and according to other embodiments, the first scan line SL1, the second scan line SL2, the third scan line SL3, the fourth scan line SL4 and the data line DL may also be made of other conductive materials such as alloy, nitride of a metal material, oxide of a metal material, nitroxide of a metal material, or a stacked layer of the metal materials and the aforementioned other conductive materials.

The first pixel structure P1, the second pixel structure P2, the third pixel structure P3 and the fourth pixel structure P4 are electrically connected to one of the first scan line SL1, the second scan line SL2, the third scan line SL3 and the fourth scan line SL4, respectively, and the first pixel structure P1, the second pixel structure P2, the third pixel structure P3 and the fourth pixel structure P4 are electrically connected to the data line DL. In detail, in the present embodiment, the first pixel structure P1 is electrically connected to the first scan line SL1, the second pixel structure P2 is electrically connected to the second scan line SL2, the third pixel structure P3 is electrically connected to the fourth scan line SL4, and the fourth pixel structure P4 is electrically connected to the third scan line SL3.

In the present embodiment, the first pixel structure P1 includes an active component T1, a reflective pixel electrode PE1 and a capacitor electrode CE1; the second pixel structure P2 includes an active component T2, a reflective pixel electrode PE2 and a capacitor electrode CE2; the third pixel structure P3 includes an active component T3, a reflective pixel electrode PE3 and a capacitor electrode CE3; and the fourth pixel structure P4 includes an active component T4, a reflective pixel electrode PE4 and a capacitor electrode CE4.

In the present embodiment, the active component T1, the active component T2, the active component T3 and the active component T4 can be bottom gate thin-film transistors or top gate thin-film transistors, and the active component T1 includes a gate G1, a channel layer CH1, a drain D1 and a source S1; the active component T2 includes a gate G2, a channel layer CH2, a drain D2 and a source S2; the active component T3 includes a gate G3, a channel layer CH3, a drain D3 and a source S3; and the active component T4 includes a gate G4, a channel layer CH4, a drain D4 and a source S4.

Taking the bottom gate thin-film transistor as an example, the gate G1 and the first scan line SL1 are a continuous conductive pattern; the gate G2 and the second scan line SL2 are a continuous conductive pattern; the gate G3 and the fourth scan line SL4 are a continuous conductive pattern; and the gate G4 and the third scan line SL3 are a continuous conductive pattern. Which presents that the gate G1 is electrically connected to the first scan line SL1; the gate G2 is electrically connected to the second scan line SL2; the gate G3 is electrically connected to the fourth scan line SL4; and the gate G4 is electrically connected to the third scan line SL3. Namely, in the present embodiment, the gates G1-G4 and the first scan line SL1, the second scan line SL2, the third scan line SL3, the fourth scan line SL4 belong to a same layer.

The channel layers CH1-CH4 are respectively located above the gates G1-G4. In the present embodiment, the material of the channel layers CH1-CH4 is, for example, amorphous silicon or an oxide semiconductor material, where the oxide semiconductor material includes indium-gallium-zinc oxide (IGZO), zinc oxide, tin oxide, indium-zinc oxide, gallium-zinc oxide (GZO), zinc-tin oxide (ZTO) or indium-tin oxide, etc. Namely, in the present embodiment, the active components T1-T4 are, for example, amorphous silicon thin-film transistors or oxide semiconductor thin-film transistors. However, the invention is not limited thereto, and in other embodiments, the active components T1-T4 can also be low temperature polysilicon thin-film transistors.

The source S1 and the drain D1 are located above the channel layer CH1; the source S2 and the drain D2 are located above the channel layer CH2; the source S3 and the drain D3 are located above the channel layer CH3; and the source S4 and the drain D4 are located above the channel layer CH4. The sources S1-S4 and the data line DL are a continuous conductive pattern, which represents that the sources S1-S4 are all electrically connected to the data line DL. The drains D1-D4 and the capacitor electrodes CE1-CE4 respectively form a continuous conductive pattern, which represents that the drains D1-D4 are electrically connected to the capacitor electrodes CE1-CE4, respectively. Moreover, in the present embodiment, the drains D1-D4, the sources S1-S4 and the capacitor electrodes CE1-CE4 and the data line DL belong to the same layer.

In the present embodiment, the gate insulation layer GI is further configured between the gate G1 and the channel layer CH1, between the gate G2 and the channel layer CH2, between the gate G3 and the channel layer CH3, and between the gate G4 and the channel layer CH4, where the gate insulation layer GI forms on the first substrate 110 and covers the gates G1-G4; and the insulation layer PV further covers the active component T1, the active component T2, the active component T3 and the active component T4 to protect the active component T1, the active component T2, the active component T3 and the active component T4. The material of the gate insulation layer GI and the insulation layer PV can be an inorganic material, an organic material or a combination thereof, where the inorganic material is, for example, silicon oxide, aluminum oxide, silicon nitride, silicon oxynitride, or a stacked layer of at least two of the aforementioned materials; and the organic material is, for example, a polymer material such as polyimide resin, epoxy resin or acrylic resin.

Moreover, in the present embodiment, the cover layer BP is further configured on the insulation layer PV to cover the active component T1, the active component T2, the active component T3 and the active component T4. In detail, in the present embodiment, the top of the cover layer BP includes a plurality of bumps X, i.e. the cover layer BP has an uneven surface. The material of the cover layer BP can be an inorganic material, an organic material or a combination thereof, where the inorganic material is, for example, silicon oxide, silicon nitride, silicon oxynitride, or a stacked layer of at least two of the aforementioned materials; and the organic material is, for example, a polymer material such as polyimide resin, epoxy resin or acrylic resin.

Moreover, in the present embodiment, the capacitor electrode CE4 of the fourth pixel structure P4 includes a capacitor electrode portion CE4a, a capacitor electrode portion CE4b and a capacitor electrode portion CE4c, where the capacitor electrode portion CE4a and the capacitor electrode portion CE4b are respectively disposed at two sides of the second scan line SL2, and the capacitor electrode portion CE4b and the capacitor electrode portion CE4c are respectively disposed at two sides of the first scan line SL1. In detail, in order to decrease a parasitic capacitance on the first scan line SL1 and the second scan line SL2, the capacitor electrode portion CE4a, the capacitor electrode portion CE4b and the capacitor electrode portion CE4c are not directly connected to each other.

The reflective pixel electrodes PE1-PE4 are electrically connected to the active components T1-T4, respectively. The reflective pixel electrode PE1 is electrically connected to the capacitor electrode CE1 through a contact hole H1, and the contact hole H1 is disposed in the cover layer BP and the insulation layer PV to expose a part of the capacitor electrode CE1. Moreover, the reflective pixel electrode PE2 is electrically connected to the capacitor electrode CE2 through a contact hole H2, and the contact hole H2 is disposed in the cover layer BP and the insulation layer PV to expose a part of the capacitor electrode CE2. Moreover, the reflective pixel electrode PE3 is electrically connected to the capacitor electrode CE3 through a contact hole H3, and the contact hole H3 is disposed in the cover layer BP and the insulation layer PV to expose a part of the capacitor electrode CE3.

Moreover, the reflective pixel electrode PE4 is electrically connected to the capacitor electrode portion CE4a, the capacitor electrode portion CE4b and the capacitor electrode portion CE4c of the capacitor electrode CE4 respectively through a contact hole H4a, a contact hole H4b and a contact hole H4c, and the contact hole H4a, the contact hole H4b, the contact hole H4c are all disposed in the cover layer BP and the insulation layer PV to respectively expose the capacitor electrode portion CE4a, the capacitor electrode portion CE4b and the capacitor electrode portion CE4c of the capacitor electrode CE4. In detail, as described above, since the capacitor electrode portion CE4a, the capacitor electrode portion CE4b and the capacitor electrode portion CE4c of the capacitor electrode CE4 are not directly connected to each other, the reflective pixel electrode PE4 is electrically connected to the capacitor electrode portion CE4a, the capacitor electrode portion CE4b and the capacitor electrode portion CE4c respectively through the contact hole H4a, the contact hole H4b and the contact hole H4c, such that the capacitor electrode CE4 and the common electrode layer 130 (which is described in detail later) may construct a proper storage capacitor.

The material of the reflective pixel electrodes PE1-PE4 is, for example, Ag, Al or other conductive materials with high reflectivity. The thickness of the reflective pixel electrodes PE1-PE4 is, for example, between 50 nm and 200 nm. Moreover, in order to avoid oxidation of the reflective pixel electrodes PE1-PE4 to influence the reflectivity, a transparent protection layer can be respectively configured on the reflective pixel electrodes PE1-PE4, and the material thereof is, for example, a transparent conductive material such as indium-tin oxide, indium-zinc oxide, aluminium-tin oxide, aluminium-zinc oxide.

Moreover, in the present embodiment, the reflective pixel electrodes PE1-PE4 cover the bumps X on the cover layer BP, such that the reflective pixel electrodes PE1-PE4 may have uneven surfaces, and the reflective liquid crystal display panel 10 may improve light reflectivity and reflection viewing angle distribution.

Moreover, in the present embodiment, an area ratio of the reflective pixel electrode PE1, the reflective pixel electrode PE2, the reflective pixel electrode PE3 and the reflective pixel electrode PE4 is 1:1:2:4. Moreover, the capacitor electrode CE1 of the first pixel structure P1 has the same or similar area with the capacitor electrode CE2 of the second pixel structure P2.

It should be noted that in all of the embodiments of the invention, the area proportion relationship (for example, the area ratio of the reflective pixel electrode PE1, the reflective pixel electrode PE2, the reflective pixel electrode PE3 and the reflective pixel electrode PE4 is 1:1:2:4) includes an error range allowed in any technical field of the invention, i.e. the error range is within a range of ±10% of an accurate value. For example, the area ratio of the reflective pixel electrode PE1 and the reflective pixel electrode PE2 of 1:1 covers the situation of the area ratio of the reflective pixel electrode PE1 and the reflective pixel electrode PE2 of 1:0.9-1.2, and the area error range of the reflective pixel electrode PE3 and the reflective pixel electrode PE4 is also the same.

In the present embodiment, the pixel unit U further includes a common electrode layer 130, which is disposed on the first substrate 100 and is electrically isolated from the reflective pixel electrodes PE1-PE4. In detail, in the present embodiment, the common electrode layer 130 includes a common electrode pattern CM1, a common electrode pattern CM2, a common electrode pattern CM3, a common electrode pattern CM4a, a common electrode pattern CM4b, a common electrode pattern CM4c respectively corresponding to the capacitor electrode CE1 of the first pixel structure P1, the capacitor electrode CE2 of the second pixel structure P2, the capacitor electrode CE3 of the third pixel structure P3, the capacitor electrode portion CE4a of the fourth pixel structure P4, the capacitor electrode portion CE4b of the fourth pixel structure P4 and the capacitor electrode portion CE4c of the fourth pixel structure P4. Moreover, in the present embodiment, the common electrode layer 130 and the gates G1-G4, the first scan line SL1, the second scan line SL2, the third scan line SL3 and the fourth scan line SL4 belong to the same layer.

In this way, the common electrode pattern CM1 of the common electrode layer 130 and the capacitor electrode CE1 of the first pixel structure P1 construct a storage capacitor Cst1; the common electrode pattern CM2 of the common electrode layer 130 and the capacitor electrode CE2 of the second pixel structure P2 construct a storage capacitor Cst2; the common electrode pattern CM3 of the common electrode layer 130 and the capacitor electrode CE3 of the third pixel structure P3 construct a storage capacitor Cst3; the common electrode pattern CM4a of the common electrode layer 130 and the capacitor electrode portion CE4a of the fourth pixel structure P4 construct a storage capacitor Cst4a; the common electrode pattern CM4b of the common electrode layer 130 and the capacitor electrode portion CE4b of the fourth pixel structure P4 construct a storage capacitor Cst4b; the common electrode pattern CM4c of the common electrode layer 130 and the capacitor electrode portion CE4c of the fourth pixel structure P4 construct a storage capacitor Cst4c; and the gate insulation layer GI located between the capacitor electrodes CE1-CE4c and the common electrode patterns CM1-CM4c serve as a capacitor dielectric layer of the storage capacitors Cst1-Cst4c.

It should be noted that in the present embodiment, since the area ratio of the reflective pixel electrode PE1 of the first pixel structure P1, the reflective pixel electrode PE2 of the second pixel structure P2, the reflective pixel electrode PE3 of the third pixel structure P3, and the reflective pixel electrode PE4 of the fourth pixel structure P4 is 1:1:2:4, and the capacitor electrode CE1, the common electrode pattern CM1 respectively have the same areas as those of the capacitor electrode CE2, the common electrode pattern CM2, so the first pixel structure P1, the second pixel structure P2, the third pixel structure P3 and the fourth pixel structure P4 may all own a proper storage capacitor area. In this way, under the low frequency operation, the reflective liquid crystal display panel 10 of the present embodiment with a problem of abnormal image display caused by failure of charge retention due to an excessively small storage capacitor area can be avoided.

According to another aspect, in the present embodiment, the common electrode pattern CM1 and the common electrode pattern CM4c are connected to each other to form a common electrode line CL1; the common electrode pattern CM2 and the common electrode pattern CM4b are connected to each other to form a common electrode line CL2; the common electrode pattern CM4a is a part of a common electrode line CL3; the common electrode pattern CM3 is a part of a common electrode line CL4; and the common electrode line CL1, the common electrode line CL2, the common electrode line CL3 and the common electrode line CL4 are all electrically connected to a common voltage Vcom.

In the present embodiment, the pixel unit U further includes a spacer PS disposed between the first substrate 100 and the second substrate 110 and covering a part of the reflective pixel electrode PE1. In detail, in the present embodiment, the spacer PS is disposed on the counter electrode layer 140, and extends to the reflective pixel electrode PE1 of the first pixel structure P1 (shown in FIG. 2). The material of the spacer PS is, for example, a photoresist material or other opaque materials.

It should be noted that in the present embodiment, even if the area ratio of the reflective pixel electrode PE1, the reflective pixel electrode PE2, the reflective pixel electrode PE3 and the reflective pixel electrode PE4 is 1:1:2:4, by configuring the spacer PS, the region where the spacer PS is located in the pixel unit U does not exist the liquid crystal molecules, so as to achieve an effect that the reflection area ratio of the first pixel structure P1, the second pixel structure P2, the third pixel structure P3 and the fourth pixel structure is actually 1:2:4:8. In detail, regarding a reflection area of the reflective pixel electrode PE1 after the area occupied by the spacer PS is deducted, the reflection area of the reflective pixel electrode PE1 actually used for reflecting environment light is only about ½ of the original area, and the reflection areas of the reflective pixel electrode PE2, the reflective pixel electrode PE3, the reflective pixel electrode PE4 are not changed, so that the reflection area ratio of the reflective pixel electrode PE1, the reflective pixel electrode PE2, the reflective pixel electrode PE3 and the reflective pixel electrode PE4 is actually 1:2:4:8. In other words, viewing from a direction perpendicular to the first substrate 100, the area ratio of the spacer PS, the reflective pixel electrode PE1, reflective pixel electrode PE2, the reflective pixel electrode PE3 and the reflective pixel electrode PE4 can be 0.5:1:1:2:4. Similar to the aforementioned description, the area proportion relationship includes an error range allowed in any technical field of the invention, i.e. the error range is within a range of ±10% of an accurate value. In this way, as the first pixel structure P1, the second pixel structure P2, the third pixel structure P3 and the fourth pixel structure P4 have the specific reflection area ratio, the reflective liquid crystal display panel 10 may display 16 gray scale levels, so as to achieve a good visual effect.

Moreover, in the present embodiment, the spacer PS is overlapped with a part of the reflective pixel electrode PE1, though the invention is not limited thereto. In other embodiments, in order to avoid a light leakage phenomenon caused by the reflective pixel electrode PE1 under the spacer PS, the reflective pixel electrode PE1 can also be disposed at a position that is not aligned with the spacer PS, i.e. the spacer PS and the reflective pixel electrode PE1 are not overlapped, so as to achieve the reflection area ratio of the reflective pixel electrode PE1, the reflective pixel electrode PE2, the reflective pixel electrode PE3 and the reflective pixel electrode PE4 of 1:2:4:8. In this way, the reflective liquid crystal display panel 10 still includes the first pixel structure P1, the second pixel structure P2, the third pixel structure P3 and the fourth pixel structure P4 with the reflection area ratio of 1:2:4:8, and can be used for displaying 16 gray scale levels.

Moreover, in the present embodiment, one pixel unit U includes four pixel structures (i.e. the first pixel structure P1, the second pixel structure P2, the third pixel structure P3 and the fourth pixel structure P4), and the reflection area ratio thereof is 1:2:4:8, so that by using the first pixel structure P1, the second pixel structure P2, the third pixel structure P3 and the fourth pixel structure P4 to control the liquid crystal layer 120, one pixel unit U is capable of display 16 gray scale levels. For example, when the liquid crystal layer 120 corresponding to the first pixel structure P1 allows the environment light to pass therethrough, and the liquid crystal layer 120 corresponding to the second, the third and the fourth pixel structures P2-P4 does not allow the environment light to pass therethrough, the reflection area capable of reflecting the environment light corresponding to the first pixel structure P1 in one pixel unit U is 1/15 of all of the reflection area, and is defined as one gray scale state. For another example, when the liquid crystal layer 120 corresponding to the first pixel structure P1 and the second pixel structure P2 allows the environment light to pass therethrough, and the liquid crystal layer 120 corresponding to the third pixel structures P3 and the fourth pixel structures P4 does not allow the environment light to pass therethrough, the reflection area capable of reflecting the environment light corresponding to the first pixel structure P1 and the second pixel structure P2 in one pixel unit U is 3/15 of all of the reflection area, and is defined as another gray scale state, and deduced by analogy, 16 gray scale levels can be used for permutation and combination, though the invention is not limited thereto. In other embodiments, one pixel unit U may also include a fifth pixel structure, i.e. one pixel unit may include five pixel structures, and by making the reflection area ratio thereof to be 1:2:4:8:16, 32 gray scale levels can be achieved.

In the present embodiment, the reflective liquid crystal display panel 10 further includes a thin-film transistor integrated gate driver 150 disposed in the periphery area BB. In detail, the thin-film transistor integrated gate driver 150 includes a plurality of thin-film transistors, and the thin-film transistor integrated gate driver 150 is formed on the first substrate 100 together with formation of the first pixel structure P1, the second pixel structure P2, the third pixel structure P3 and the fourth pixel structure P4. Namely, in the present embodiment, the reflective liquid crystal display panel 10 adopts the gate driver on array (GOA) technique.

Moreover, in the present embodiment, the first scan line SL1, the second scan line SL2, the third scan line SL3 and the fourth scan line SL4 of each of the pixel units U are electrically connected to the thin-film transistor integrated gate driver 150. Therefore, compared to a reflective liquid crystal display panel with the same resolution and each of the pixel units therein includes two data lines and two scan lines, by using only one data line DL to simultaneously drive four active components T1-T4 in each of the pixel units U and by adopting the GOA technique to achieve the scan function, the reflective liquid crystal display panel 10 may have decreased manufacturing cost.

According to the first embodiment, it is known that the pixel unit U at least includes the first pixel structure P1, the second pixel structure P2, the third pixel structure P3 and the fourth pixel structure P4 with the reflection area ratio of 1:2:4:8, such that the reflective liquid crystal display panel 10 may at least display 16 gray scale levels to achieve a good visual effect. Moreover, as the area ratio of the reflective pixel electrode PE1 of the first pixel structure P1, the reflective pixel electrode PE2 of the second pixel structure P2, the reflective pixel electrode PE3 of the third pixel structure P3, and the reflective pixel electrode PE4 of the fourth pixel structure P4 is 1:1:2:4, and the capacitor electrode CE1 and the common electrode pattern CM1 respectively have the same areas as those of the capacitor electrode CE2 and the common electrode pattern CM2, the reflective liquid crystal display panel 10 with the problem of abnormal image display caused by an excessively small storage capacitor area can be avoided, such that a good image display effect is achieved. Moreover, since in the reflective liquid crystal display panel 10, only one data line DL is adopted to simultaneously drive four active components T1-T4, and the GOA technique is adopted to achieve the scan function, the manufacturing cost thereof can be effectively decreased.

Figure 3:
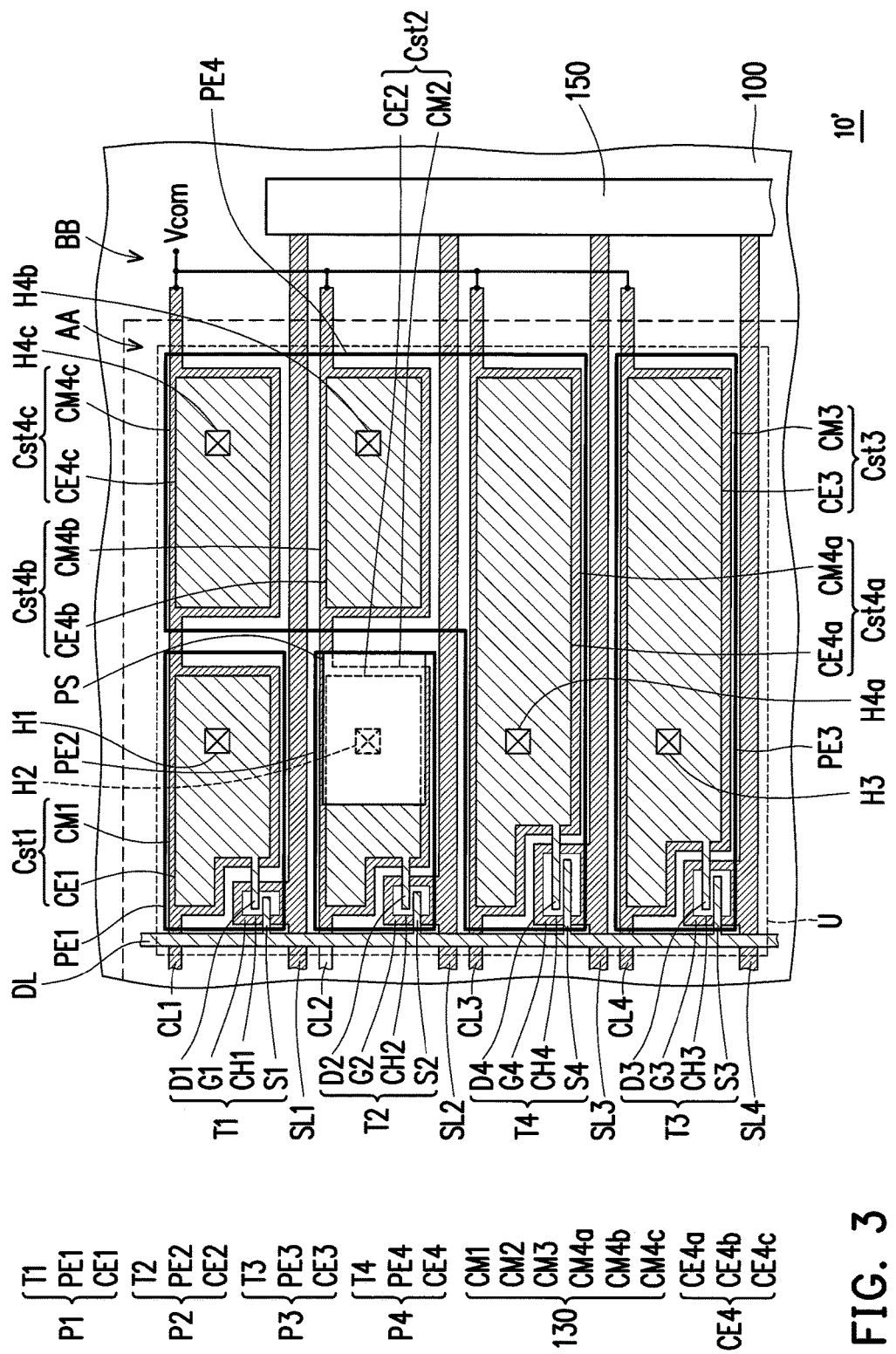
FIG. 3 is a top view of a reflective liquid crystal display panel according to a second embodiment of the invention.

FIG. 3 is a top view of a reflective liquid crystal display panel according to a second embodiment of the invention. In detail, the embodiment of FIG. 3 is similar to the embodiment of FIG. 1 to FIG. 2, where the same or like reference numerals in the drawings denote the same or like elements, and thus their description will be omitted.

According to FIG. 3 and FIG. 1, it is known that a main difference between the reflective liquid crystal display panel 10' and the reflective liquid crystal display panel 10 is that the spacer PS in the reflective liquid crystal display panel 10' is configured to cover a part of the reflective pixel electrode PE2, while the spacer PS in the reflective liquid crystal display panel 10 is configured to cover a part of the reflective pixel electrode PE1.

In this way, in the reflective liquid crystal display panel 10' of the present embodiment, by configuring the spacer PS, the region where the spacer PS is located in the pixel unit U does not exist the liquid crystal molecules, such that the first pixel structure P1, the second pixel structure P2, the third pixel structure P3 and the fourth pixel structure P4 with the area ratio of 1:1:2:4 may actually achieve the effect of the reflection area ratio of 2:1:4:8. In detail, regarding a reflection area of the reflective pixel electrode PE2 after the area occupied by the spacer PS is deducted, the reflection area of the reflective pixel electrode PE2 actually used for reflecting environment light is only about ½ of the original area, and the reflection areas of the reflective pixel electrode PE1, the reflective pixel electrode PE3, the reflective pixel electrode PE4 are not changed, so that the reflection area ratio of the reflective pixel electrode PE1, the reflective pixel electrode PE2, the reflective pixel electrode PE3 and the reflective pixel electrode PE4 is actually 2:1:4:8. In other words, viewing from the direction perpendicular to the first substrate 100, the area ratio of the spacer PS, the reflective pixel electrode PE1, the reflective pixel electrode PE2, the reflective pixel electrode PE3 and the reflective pixel electrode PE4 can be 0.5:1:1:2:4. Similar to the aforementioned description, the area proportion relationship includes the error range allowed in any technical field of the invention, i.e. the error range is within a range of ±10% of an accurate value. It should be noted that as described above, as the first pixel structure P1, the second pixel structure P2, the third pixel structure P3 and the fourth pixel structure P4 have the specific reflection area ratio, the reflective liquid crystal display panel 10' may display 16 gray scale levels, so as to achieve a good visual effect.

Figure 4:
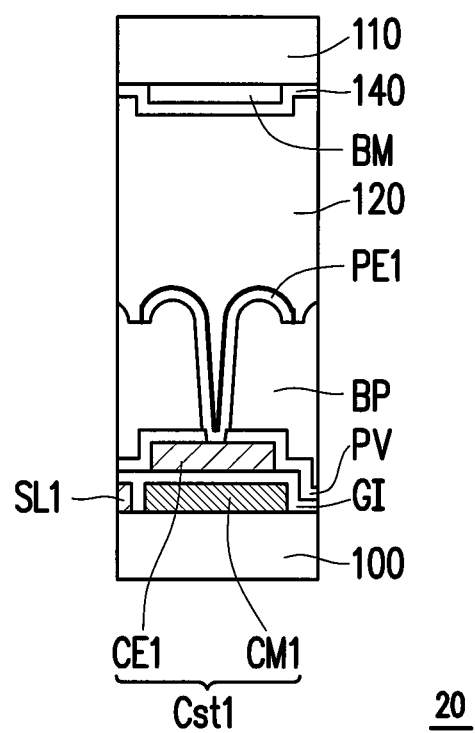
FIG. 4 is a partial cross-sectional view of a reflective liquid crystal display panel according to a third embodiment of the invention.

FIG. 4 is a partial cross-sectional view of a reflective liquid crystal display panel according to a third embodiment of the invention. A top view of the reflective liquid crystal display panel 20 of FIG. 4 may refer to FIG. 1, where a cross-section position of FIG. 4 may refer to the position of the section line A-A' of FIG. 1. Moreover, the embodiment of FIG. 4 is similar to the embodiment of FIG. 1 and FIG. 2, and the same or like reference numerals in the drawings denote the same or like elements, and thus their description will be omitted.

According to FIG. 2 and FIG. 4, it is known that a difference between the reflective liquid crystal display panel 20 and the reflective liquid crystal display panel 10 is that the pixel unit U in the reflective liquid crystal display panel 20 includes a light-shielding pattern BM disposed on the second substrate 110 and shielding a part of the reflective pixel electrode PE1 along a perpendicular projection direction of the second substrate 110, and none spacer is configured. The material of the light-shielding pattern BM is, for example, an opaque material such as black resin or a light-shielding metal (for example, chromium).

In detail, in the present embodiment, by configuring the light-shielding pattern BM to shield a part of a reflected light coming from the reflective pixel electrode PE1 of the first pixel structure P1, even if the area ratio of the reflective pixel electrode PE1 of the first pixel structure P1, the reflective pixel electrode PE2 of the second pixel structure P2, the reflective pixel electrode PE3 of the third pixel structure P3, and the reflective pixel electrode PE4 of the fourth pixel structure P4 is 1:1:2:4, the reflection area ratio of the first pixel structure P1, the second pixel structure P2, the third pixel structure P3 and the fourth pixel structure P4 is still 1:2:4:8. In other words, viewing from the direction perpendicular to the first substrate 100, the area ratio of the light-shielding pattern BM, the reflective pixel electrode PE1, the reflective pixel electrode PE2, the reflective pixel electrode PE3, and the reflective pixel electrode PE4 can be 0.5:1:1:2:4. Similarly, as described in the first embodiment, the area proportion relationship of the present embodiment includes an error range allowed in any technical field of the invention, i.e. the error range is within a range of ±10% of an accurate value. In this way, as the first pixel structure P1, the second pixel structure P2, the third pixel structure P3 and the fourth pixel structure P4 have the specific reflection area ratio, the reflective liquid crystal display panel 20 may display 16 gray scale levels, so as to achieve a good visual effect.

Moreover, in the present embodiment, the light-shielding pattern BM is disposed on the second substrate 110, though those skilled in the art should understand that the light-shielding pattern BM can also be disposed on the first substrate 100.

Moreover, according to the first embodiment, the second embodiment and the third embodiment, it is known that the light-shielding pattern BM in the reflective liquid crystal display panel 20 can also be configured to shield a part of the reflective pixel electrode PE2 along the perpendicular projection direction of the second substrate 110 (not shown), such that the pixel unit U at least includes the first pixel structure P1, the second pixel structure P2, the third pixel structure P3 and the fourth pixel structure P4 with the reflection area ratio of 2:1:4:8. In other words, viewing from the direction perpendicular to the first substrate 100, the area ratio of the light-shielding pattern BM, the reflective pixel electrode PE1, the reflective pixel electrode PE2, the reflective pixel electrode PE3 and the reflective pixel electrode PE4 can be 0.5:1:1:2:4. Now, the area ratio of the reflective pixel electrode PE1 of the first pixel structure P1, the reflective pixel electrode PE2 of the second pixel structure P2, the reflective pixel electrode PE3 of the third pixel structure P3, and the reflective pixel electrode PE4 of the fourth pixel structure P4 is 1:1:2:4.

Figure 5:
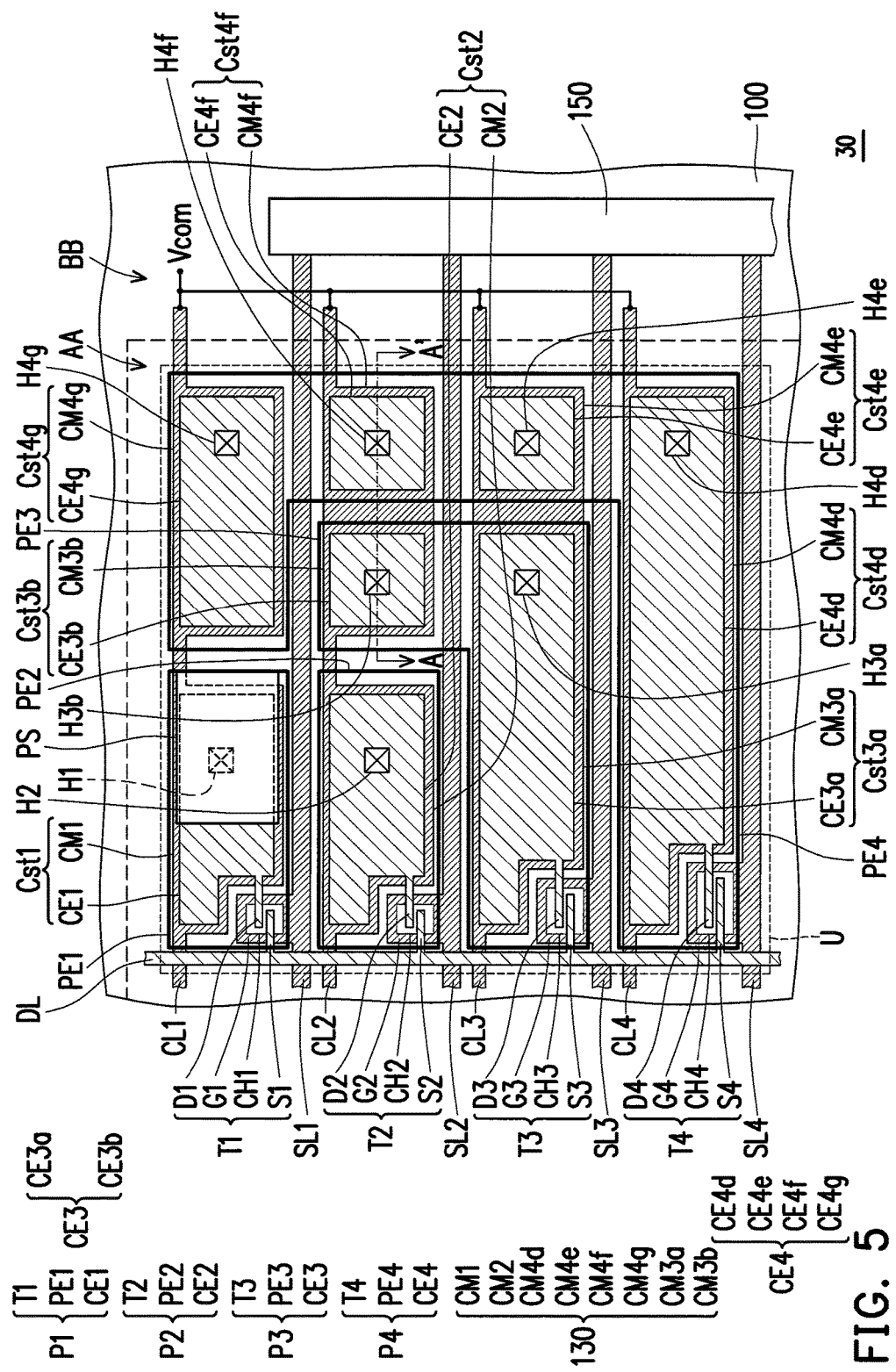
FIG. 5 is a top view of a reflective liquid crystal display panel according to a fourth embodiment of the invention.
Figure 6:
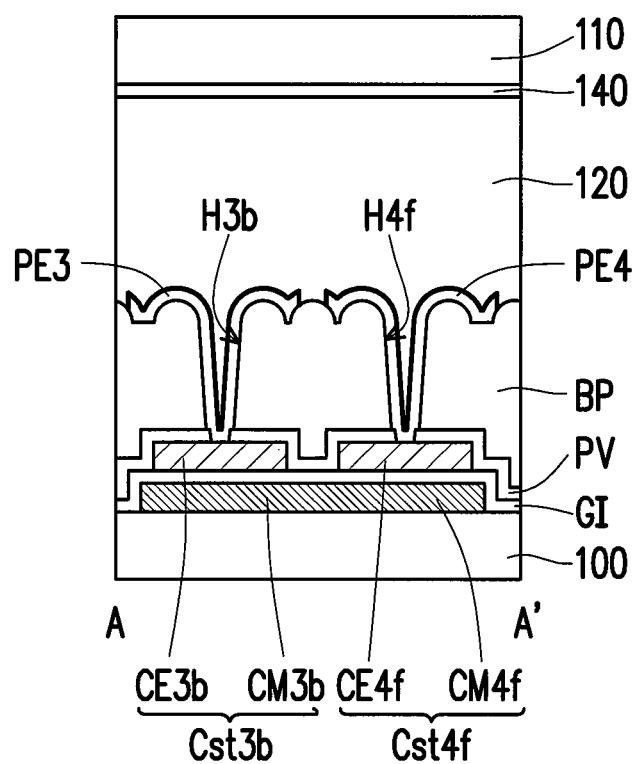
FIG. 6 is a cross-sectional view along a section line A-A' of FIG. 5.

FIG. 5 is a top view of a reflective liquid crystal display panel according to a fourth embodiment of the invention. FIG. 6 is a cross-sectional view along a section line A-A' of FIG. 5. The reflective liquid crystal display panel 30 of FIG. 5 is similar to the reflective liquid crystal display panel 10 of FIG. 1, and a main difference there between lies in a different configuration structure of the third pixel structure P3 and the fourth pixel structure P4, where the same or like reference numerals in the drawings denote the same or like elements, and thus their description will be omitted. In the following description, only the difference between the reflective liquid crystal display panels 30 and 10 is described.

Referring to FIG. 5 and FIG. 6, in the present embodiment, the third pixel structure P3 is electrically connected to the third scan line SL3, and the fourth pixel structure P4 is electrically connected to the fourth scan line SL4. Namely, in the present embodiment, the gate G3 of the active component T3 and the third scan line SL3 are a continuous conductive pattern, and the gate G4 of the active component T4 and the fourth scan line SL4 are a continuous conductive pattern.

Moreover, in the present embodiment, the capacitor electrode CE3 of the third pixel structure P3 includes a capacitor electrode portion CE3a and a capacitor electrode portion CE3b, where the capacitor electrode portion CE3a and the capacitor electrode portion CE3b are respectively disposed at two sides of the second scan line SL2. In detail, in order to decrease a parasitic capacitance on the second scan line SL2, the capacitor electrode portion CE3a and the capacitor electrode portion CE3b of the capacitor electrode CE3 are not directly connected.

The capacitor electrode CE4 of the fourth pixel structure P4 includes a capacitor electrode portion CE4d, a capacitor electrode portion CE4e, a capacitor electrode portion CE4f and a capacitor electrode portion CE4g, where the capacitor electrode portion CE4d and the capacitor electrode portion CE4e are respectively disposed at two sides of the third scan line SL3, the capacitor electrode portion CE4e and the capacitor electrode portion CE4f are respectively disposed at two sides of the second scan line SL2, and the capacitor electrode portion CE4f and the capacitor electrode portion CE4g are respectively disposed at two sides of the first scan line SL1. In detail, in order to decrease parasitic capacitances on the first scan line SL1, the second scan line SL2 and the third scan line SL3, the capacitor electrode portion CE4d, the capacitor electrode portion CE4e, the capacitor electrode portion CE4f and the capacitor electrode portion CE4g of the capacitor electrode CE4 are not directly connected.

Moreover, in the present embodiment, the common electrode pattern CM3a of the common electrode layer 130 corresponds to the capacitor electrode portion CE3a of the third pixel structure P3; the common electrode pattern CM3b of the common electrode layer 130 corresponds to the capacitor electrode portion CE3b of the third pixel structure P3; the common electrode pattern CM4d of the common electrode layer 130 corresponds to the capacitor electrode portion CE4d of the fourth pixel structure P4; the common electrode pattern CM4e of the common electrode layer 130 corresponds to the capacitor electrode portion CE4e of the fourth pixel structure P4; the common electrode pattern CM4f of the common electrode layer 130 corresponds to the capacitor electrode portion CE4f of the fourth pixel structure P4; and the common electrode pattern CM4g of the common electrode layer 130 corresponds to the capacitor electrode portion CE4g of the fourth pixel structure P4.

In the present embodiment, the common electrode pattern CM3b and the common electrode pattern CM4f are a continuous conductive pattern, and the common electrode pattern CM3a and the common electrode pattern CM4e are a continuous conductive pattern. Moreover, in the present embodiment, the common electrode pattern CM1 and the common electrode pattern CM4g are connected to each other to form a common electrode line CL1; the common electrode pattern CM2, the common electrode pattern CM3b and the common electrode pattern CM4f are connected to each other to form a common electrode line CL2; the common electrode pattern CM3a and the common electrode pattern CM4e are a part of a common electrode line CL3; the common electrode pattern CM4d is a part of a common electrode line CL4; and the common electrode line CL1, the common electrode line CL2, the common electrode line CL3 and the common electrode line CL4 are all electrically connected to the common voltage Vcom.

Therefore, in the present embodiment, in order to make the third pixel structure P3 to have a proper storage capacitor area, the reflective pixel electrode PE3 of the third pixel structure P3 is electrically connected to the capacitor electrode portion CE3a and the capacitor electrode portion CE3b respectively through a contact hole H3a and a contact hole H3b, such that the capacitor electrode portion CE3a and the common electrode pattern CM3a of the common electrode layer 130 construct a storage capacitor Cst3a, and the capacitor electrode portion CE3b and the common electrode pattern CM3b of the common electrode layer 130 construct a storage capacitor Cst3b. The contact hole H3a is disposed in the cover layer BP and the insulation layer PV to expose a part of the capacitor electrode portion CE3a, and the contact hole H3b is disposed in the cover layer BP and the insulation layer PV to expose a part of the capacitor electrode portion CE3b.

In order to make the fourth pixel structure P4 to have a proper storage capacitor area, the reflective pixel electrode PE4 of the fourth pixel structure P4 is electrically connected to the capacitor electrode portion CE4d, the capacitor electrode portion CE4e, the capacitor electrode portion CE4f and the capacitor electrode portion CE4g respectively through a contact hole H4d, a contact hole H4e, a contact hole H4f and a contact hole H4g, such that the capacitor electrode portion CE4d and the common electrode pattern CM4d of the common electrode layer 130 construct a storage capacitor Cst4d; the capacitor electrode portion CE4e and the common electrode pattern CM4e of the common electrode layer 130 construct a storage capacitor Cst4e; the capacitor electrode portion CE4f and the common electrode pattern CM4f of the common electrode layer 130 construct a storage capacitor Cst4f; and the capacitor electrode portion CE4g and the common electrode pattern CM4g of the common electrode layer 130 construct a storage capacitor Cst4g. The contact hole H4d is disposed in the cover layer BP and the insulation layer PV to expose the capacitor electrode portion CE4d, the contact hole H4e is disposed in the cover layer BP and the insulation layer PV to expose the capacitor electrode portion CE4e, the contact hole H4f is disposed in the cover layer BP and the insulation layer PV to expose the capacitor electrode portion CE4f, and the contact hole H4g is disposed in the cover layer BP and the insulation layer PV to expose the capacitor electrode portion CE4g.

According to the first embodiment and the fourth embodiment, it is known that although a configuration structure of the third pixel structure P3 and the fourth pixel structure P4 of the reflective liquid crystal display panel 30 is different from that of the third pixel structure P3 and the fourth pixel structure P4 of the reflective liquid crystal display panel 10, since the pixel unit U also at least includes the first pixel structure P1, the second pixel structure P2, the third pixel structure P3 and the fourth pixel structure P4 with the reflective area ratio of 1:2:4:8, the reflective liquid crystal display panel 30 may at least display 16 gray scale levels to achieve a good visual effect. Moreover, similarly, as the area ratio of the reflective pixel electrode PE1 of the first pixel structure P1, the reflective pixel electrode PE2 of the second pixel structure P2, the reflective pixel electrode PE3 of the third pixel structure P3, and the reflective pixel electrode PE4 of the fourth pixel structure P4 is 1:1:2:4, and the capacitor electrode CE1 and the common electrode pattern CM1 respectively have the same areas as those of the capacitor electrode CE2 and the common electrode pattern CM2, the reflective liquid crystal display panel 30 with the problem of abnormal image display caused by an excessively small storage capacitor area can be avoided, such that a good image display effect is achieved. Moreover, similarly, in the reflective liquid crystal display panel 30, only one data line DL is adopted in each of the pixel units U to simultaneously drive four active components T1-T4, and the GOA technique is adopted to achieve the scan function, the manufacturing cost can be effectively decreased.

Moreover, based on the first embodiment, the second embodiment and the fourth embodiment, it is known that the reflective liquid crystal display panel 30 may be adopted the same design concept to configure the spacer PS for covering a part of the reflective pixel electrode PE2 (not shown) to replace the original design of the fourth embodiment where the spacer PS is configured to cover a part of the reflective pixel electrode PE1, so as to achieve the effect that the pixel unit U at least includes the first pixel structure P1, the second pixel structure P2, the third pixel structure P3 and the fourth pixel structure P4 with the actual reflection area ratio of 2:1:4:8. Alternatively, a light-shielding pattern (not shown) can be adopted to replace the aforementioned spacer PS to achieve the same invention effect. Other design conditions are the same with that of the fourth embodiment, and detail thereof is not repeated.

Figure 7:
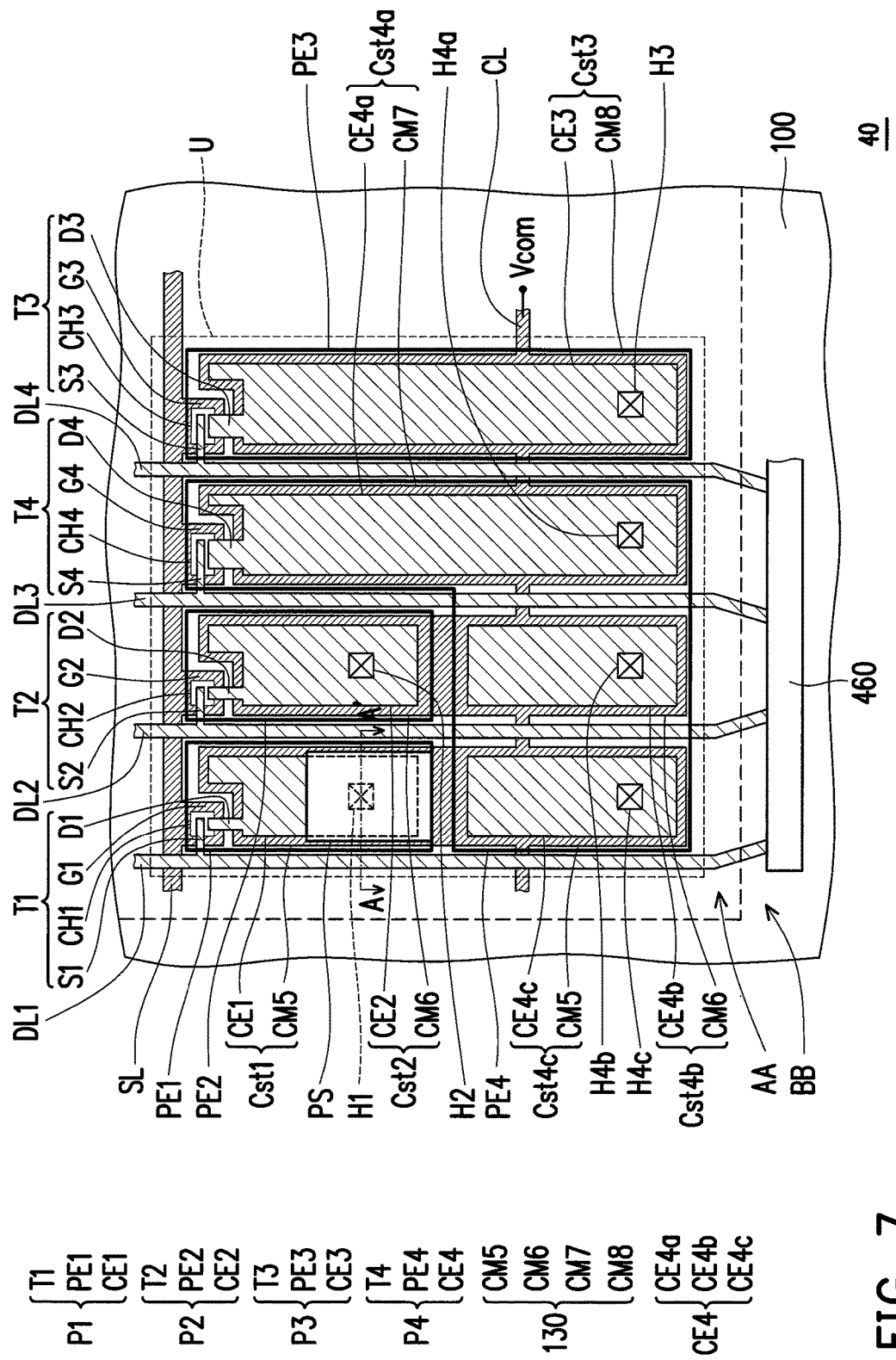
FIG. 7 is a top view is of a reflective liquid crystal display panel according to a fifth embodiment of the invention.
Figure 8:
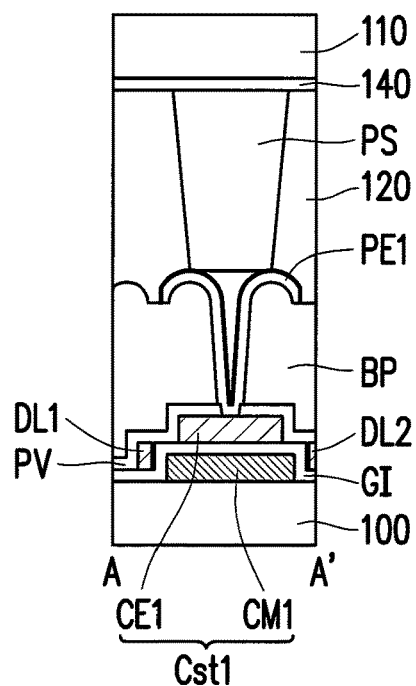
FIG. 8 is a cross-sectional view along a section line A-A' of FIG. 7.

Moreover, in the embodiments of FIG. 1 to FIG. 6, the first signal line is the data line DL, and the four second signal lines are the first scan line SL1, the second scan line SL2, the third scan line SL3 and the fourth scan line SL4, though the invention is not limited thereto. In other embodiments, the first signal line can also be a scan line, and the four second signal lines can be four data lines. FIG. 7 and FIG. 8 are described in detail below.

FIG. 7 is a top view of a reflective liquid crystal display panel according to a fifth embodiment of the invention. FIG. 8 is a cross-sectional view along a section line A-A' of FIG. 7. It should be noted that the reflective liquid crystal display panel 40 of FIG. 7 is similar to the reflective liquid crystal display panel 10 of FIG. 1, and a main difference there between is that the pixel unit U of the reflective liquid crystal display panel 40 includes one scan line SL and four data lines (i.e. the a first data line DL1, a second data line DL2, a third data line DL3 and a fourth data line DL4), and the pixel unit U of the reflective liquid crystal display panel 10 includes one data line DL and four scan lines (i.e. the first scan line SL1, the second scan line SL2, the third scan line SL3 and the fourth scan line SL4), and the reflective liquid crystal display panel 40 further includes a multiplexer 460, where the same or like reference numerals in the drawings denote the same or like elements, and thus their description will be omitted. The differences of the two embodiments are described below.

Referring to FIG. 7 and FIG. 8, in the present embodiment, the first data line DL1, the second data line DL2, the third data line DL3, the fourth data line DL4 and the scan line SL are disposed on the first substrate 100. The extending direction of the first data line DL1, the second data line DL2, the third data line DL3 and the fourth data line DL4 is different from the extending direction of the scan line SL, and preferably the extending direction of the first data line DL1, the second data line DL2, the third data line DL3 and the fourth data line DL4 is perpendicular to the extending direction of the scan line SL.

Moreover, the first data line DL1, the second data line DL2, the third data line DL3 and the fourth data line DL4 are located in one layer, and the scan line SL is located in another layer. The gate insulation layer GI is located between the four data lines (DL1, DL2, DL3 and DL4) and the scan line SL. Considering conductivity, the first data line DL1, the second data line DL2, the third data line DL3, the fourth data line DL4 and the scan line SL are generally made of metal. However, the invention is not limited thereto, and in other embodiments, the first data line DL1, the second data line DL2, the third data line DL3, the fourth data line DL4 and the scan line SL may also be made of other conductive materials such as alloy, nitride of a metal material, oxide of a metal material, nitroxide of a metal material, or a stacked layer of the metal materials and the aforementioned other conductive materials.

In the present embodiment, the first pixel structure P1, the second pixel structure P2, the third pixel structure P3 and the fourth pixel structure P4 are respectively and electrically connected to one of the first data line DL1, the second data line DL2, the third data line DL3 and the fourth data line DL4, and the first pixel structure P1, the second pixel structure P2, the third pixel structure P3 and the fourth pixel structure P4 are electrically connected to the scan line SL. In detail, in the present embodiment, the first pixel structure P1 is electrically connected to the first data line DL1, the second pixel structure P2 is electrically connected to the second data line DL2, the third pixel structure P3 is electrically connected to the fourth data line DL4, and the fourth pixel structure P4 is electrically connected to the third data line DL3.

Moreover, in the present embodiment, the gates G1-G4 and the scan line SL are a continuous conductive pattern, which represents that the gates G1-G4 are electrically connected to the scan line SL. Namely, in the present embodiment, the gates G1-G4 and the scan line SL belong to the same layer.

In the present embodiment, the source S1 and the first data line DL1 are a continuous conductive pattern; the source S2 and the second data line DL2 are a continuous conductive pattern; the source S3 and the fourth data line DL4 are a continuous conductive pattern; and the source S4 and the third data line DL3 are a continuous conductive pattern, which represents that the source S1 is electrically connected to the first data line DL1; the source S2 is electrically connected to the second data line DL2; the source S3 is electrically connected to the fourth data line DL4; and the source S4 is electrically connected to the third data line DL3. Namely, in the present embodiment, the drains D1-D4, the sources S1-S4, the capacitor electrodes CE1-CE4, the first data line DL1, the second data line DL2, the third data line DL3 and the fourth data line DL4 all belong to the same layer.

In the present embodiment, the capacitor electrode portion CE4a and the capacitor electrode portion CE4b of the fourth pixel structure P4 are respectively disposed at two sides of the third data line DL3, and the capacitor electrode portion CE4b and the capacitor electrode portion CE4c are respectively disposed at two sides of the second data line DL2. In detail, since the capacitor electrode CE4 and the second data line DL2, the third data line DL3 belong to the same layer, the capacitor electrode portions CE4a-CE4c of the capacitor electrode CE4 cannot be directly connected to each other.

In the present embodiment, the common electrode layer 130 includes a plurality of common electrode patterns CM5-CM8, where the common electrode pattern CM5 corresponds to the capacitor electrode CE1 of the first pixel structure P1 and the capacitor electrode portion CE4c of the fourth pixel structure P4; the common electrode pattern CM6 corresponds to the capacitor electrode CE2 of the second pixel structure P2 and the capacitor electrode portion CE4b of the fourth pixel structure P4; the common electrode pattern CM7 corresponds to the capacitor electrode CE4a of the fourth pixel structure P4; and the common electrode pattern CM8 corresponds to the capacitor electrode CE3 of the third pixel structure P3.

In this way, the common electrode pattern CM5 of the common electrode layer 130 and the capacitor electrode CE1 of the first pixel structure P1 construct a storage capacitor Cst1; the common electrode pattern CM6 of the common electrode layer 130 and the capacitor electrode CE2 of the second pixel structure P2 construct a storage capacitor Cst2; the common electrode pattern CM8 of the common electrode layer 130 and the capacitor electrode CE3 of the third pixel structure P3 construct a storage capacitor Cst3; the common electrode pattern CM7 of the common electrode layer 130 and the capacitor electrode portion CE4a of the fourth pixel structure P4 construct a storage capacitor Cst4a; the common electrode pattern CM6 of the common electrode layer 130 and the capacitor electrode portion CE4b of the fourth pixel structure P4 construct a storage capacitor Cst4b; the common electrode pattern CM5 of the common electrode layer 130 and the capacitor electrode portion CE4c of the fourth pixel structure P4 construct a storage capacitor Cst4c; and the gate insulation layer GI located between the capacitor electrodes CE1-CE4 and the common electrode patterns CM5-CM8 serves as a capacitor dielectric layer of the storage capacitors Cst1-Cst4c.

Moreover, in the present embodiment, the common electrode patterns CM5-CM8 are connected to each other to form a common electrode line CL, where the common electrode line CL is electrically connected to the common voltage Vcom.

In the present embodiment, the reflective liquid crystal display panel 40 further includes a plurality of multiplexers 460 disposed in the periphery area BB. In detail, in the present embodiment, the first data line DL1, the second data line DL2, the third data line DL3, the fourth data line DL4 in each of the pixel units are electrically connected to one of the plurality of multiplexers 460, i.e. the multiplexer 460 is a 1-to-4 multiplexer. In this way, compared to the reflective liquid crystal display panel with the same resolution where each of the pixel units includes two data lines and two scan lines, by using only one scan line SL in each of the pixel units U to simultaneously drive four active components T1-T4 and by configuring the multiplexer 460 to reduce the number of lines used for transmitting the driving signal, the manufacturing cost of the reflective liquid crystal display panel 40 is decreased. As described above, for simplicity's sake, only one pixel unit U and the corresponding multiplexer 460 are illustrated in FIG. 7, though the reflective liquid crystal display panel 40 is actually composed of a plurality of pixel units U arranged in an array, and includes a plurality of the multiplexers 460.

According to the first embodiment and the fifth embodiment, it is known that the pixel unit U of the reflective liquid crystal display panel 40 also at least includes the first pixel structure P1, the second pixel structure P2, the third pixel structure P3 and the fourth pixel structure P4 with the reflection area ratio of 1:2:4:8, such that the reflective liquid crystal display panel 40 may at least display 16 gray scale levels to achieve good visual effect. Moreover, similarly, since the area ratio of the reflective pixel electrode PE1 of the first pixel structure P1, the reflective pixel electrode PE2 of the second pixel structure P2, the reflective pixel electrode PE3 of the third pixel structure P3, and the reflective pixel electrode PE4 of the fourth pixel structure P4 is 1:1:2:4, and the capacitor electrode CE1, the common electrode pattern CM1 respectively have the same areas as those of the capacitor electrode CE2 and the common electrode pattern CM2, the reflective liquid crystal display panel 40 with the problem of abnormal image display caused by excessively small storage capacitor area can be avoided, so as to achieve a good image display effect.

Moreover, based on the first embodiment, the second embodiment and the fifth embodiment, it is known that the reflective liquid crystal display panel 40 may be adopted the same design concept to configure the spacer PS for covering a part of the reflective pixel electrode PE2 (not shown) to replace the original design of the fifth embodiment where the spacer PS is configured to cover a part of the reflective pixel electrode PE1, so as to achieve the effect that the pixel unit U at least includes the first pixel structure P1, the second pixel structure P2, the third pixel structure P3 and the fourth pixel structure P4 with the actual reflection area ratio of 2:1:4:8. Other design conditions are the same with that of the fifth embodiment, and detail thereof is not repeated.

Moreover, according to the fifth embodiment, it is known that in the reflective liquid crystal display panel 40, by using only one scan line SL in each of the pixel units U to simultaneously drive the four active components T1-T4 and by configuring the multiplexer 460 to reduce the number of lines used for transmitting the driving signal, the manufacturing cost of the reflective liquid crystal display panel 40 is decreased.

Figure 9:
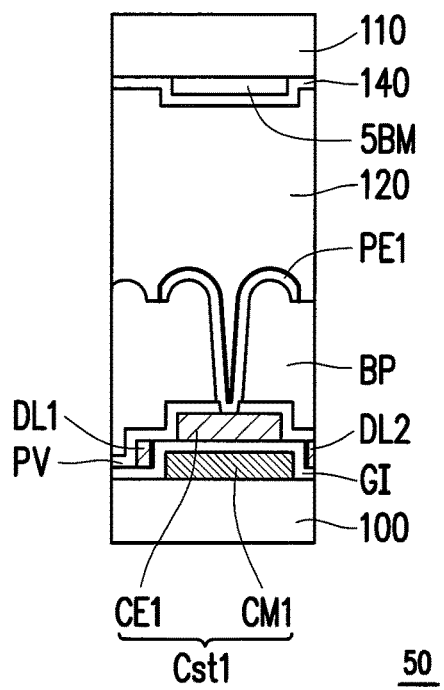
FIG. 9 is a partial cross-sectional view of a reflective liquid crystal display panel according to a sixth embodiment of the invention.

FIG. 9 is a partial cross-sectional view of a reflective liquid crystal display panel according to a sixth embodiment of the invention. Referring to FIG. 7 for a top view of the reflective liquid crystal display panel 50 of FIG. 9, where the position of the section line A-A' of FIG. 7 can be referred for a cross-section position of FIG. 9. Moreover, the embodiment of FIG. 9 is similar to the embodiment of FIG. 7 and FIG. 8, so that the same or like reference numerals in the drawings denote the same or like elements, and thus their description will be omitted.

Referring to FIG. 8 and FIG. 9, it is known that a main difference between the reflective liquid crystal display panel 40 and the reflective liquid crystal display panel 50 is that in the reflective liquid crystal display panel 50, the pixel unit U includes a light-shielding pattern 5BM configured on the second substrate 110 and shielding a part of the reflective pixel electrode PE1 along a vertical projection direction of the second substrate 110, and includes none spacer. The material of the light-shielding pattern 5BM is, for example, black resin or a light-shielding metal (for example, chromium), that has lower reflectivity.

In detail, in the present embodiment, by configuring the light-shielding pattern 5BM to shield a part of the reflected light coming from the reflective pixel electrode PE1 of the first pixel structure P1, even if the area ratio of the reflective pixel electrode PE1 of the first pixel structure P1, the reflective pixel electrode PE2 of the second pixel structure P2, the reflective pixel electrode PE3 of the third pixel structure P3, and the reflective pixel electrode PE4 of the fourth pixel structure P4 is 1:1:2:4, the reflection area ratio of the first pixel structure P1, the second pixel structure P2, the third pixel structure P3 and the fourth pixel structure P4 is still 1:2:4:8. In other words, viewing from the direction perpendicular to the first substrate 100, the area ratio of the light-shielding pattern 5BM, the reflective pixel electrode PE1, the reflective pixel electrode PE2, the reflective pixel electrode PE3, and the reflective pixel electrode PE4 can be 0.5:1:1:2:4. Similar to the first embodiment, the area proportion relationship of the present embodiment includes an error range allowed in any technical field of the invention, i.e. the error range is within a range of ±10% of an accurate value. In this way, as the first pixel structure P1, the second pixel structure P2, the third pixel structure P3 and the fourth pixel structure P4 have the specific reflection area ratio, the reflective liquid crystal display panel 50 may display 16 gray scale levels, so as to achieve a good visual effect.

Moreover, in the present embodiment, the light-shielding pattern 5BM is disposed on the second substrate 110, though those skilled in the art should understand that the light-shielding pattern 5BM can also be disposed on the first substrate 100.

According to the fifth embodiment and the sixth embodiment, it is known that as the pixel unit U at least includes the first pixel structure P1, the second pixel structure P2, the third pixel structure P3 and the fourth pixel structure P4 with the reflection area ratio of 1:2:4:8, the reflective liquid crystal display panel 50 may at least display 16 gray scale levels, so as to achieve the good visual effect.

Moreover, according to the first embodiment, the second embodiment and the sixth embodiment, it is known that the reflective liquid crystal display panel 50 may be adopted the same design concept to configure the light-shielding pattern 5BM to shield a part of the reflective pixel electrode PE2 (not shown) along the vertical projection direction of the second substrate 110 to replace the original design of the sixth embodiment where the light-shielding pattern 5BM is configured to cover a part of the reflective pixel electrode PE1, so as to achieve the effect that the pixel unit U at least includes the first pixel structure P1, the second pixel structure P2, the third pixel structure P3 and the fourth pixel structure P4 with the actual reflection area ratio of 2:1:4:8. Other design conditions are the same with that of the sixth embodiment, and detail thereof is not repeated.

Figure 10:
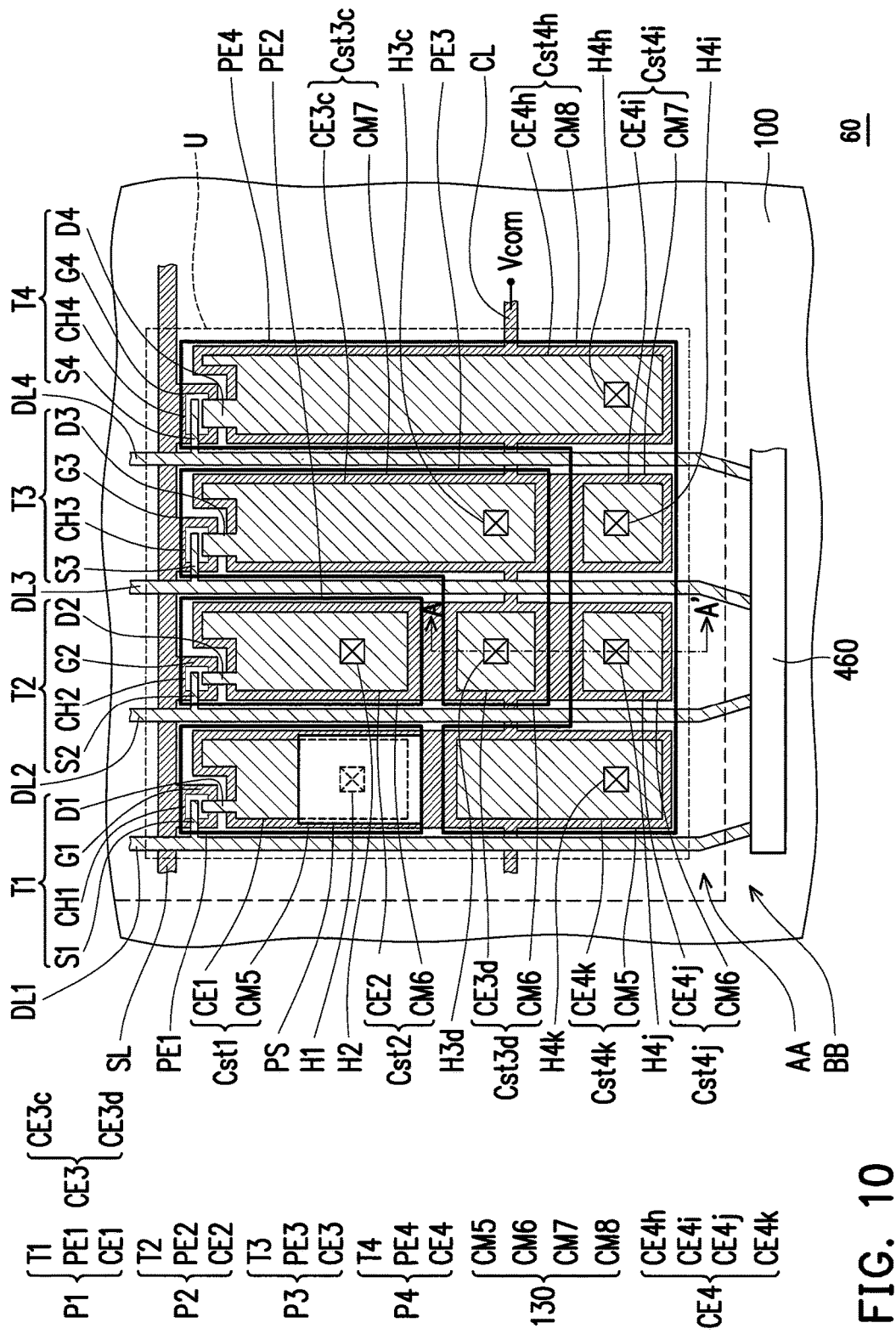
FIG. 10 is a top view of a reflective liquid crystal display panel according to a seventh embodiment of the invention.
Figure 11:
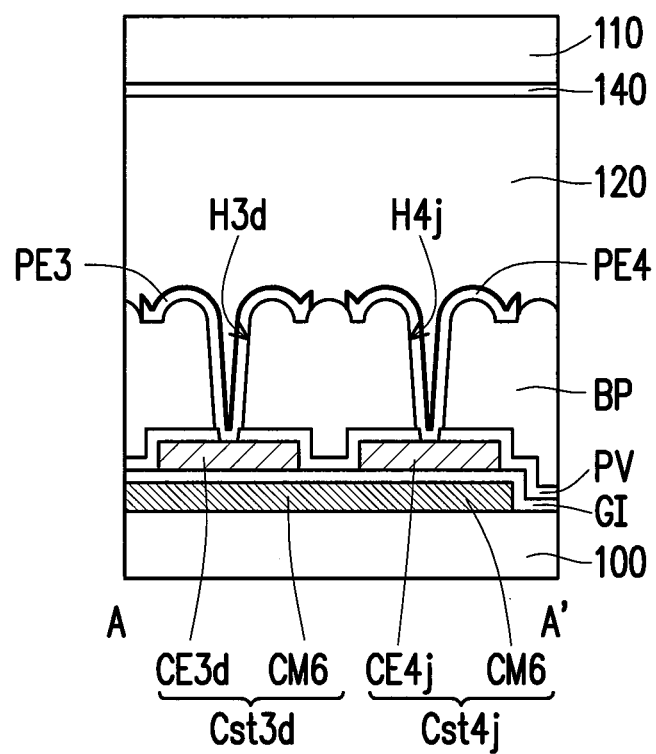
FIG. 11 is a cross-sectional view along a section line A-A' of FIG. 10.

FIG. 10 is a top view of a reflective liquid crystal display panel according to a seventh embodiment of the invention. FIG. 11 is a cross-sectional view along a section line A-A' of FIG. 10. The reflective liquid crystal display panel 60 of FIG. 10 is similar to the reflective liquid crystal display panel 40 of FIG. 7, and a difference there between is that a configuration structure of the third pixel structure P3 and the fourth pixel structure P4 of the reflective liquid crystal display panel 60 is different from that of the third pixel structure P3 and the fourth pixel structure P4 of the reflective liquid crystal display panel 40, where the same or like reference numerals in the drawings denote the same or like elements, and thus their description will be omitted. In the following description, only the difference between the reflective liquid crystal display panels 60 and 40 is described.

Referring to FIG. 10 and FIG. 11, in the present embodiment, the third pixel structure P3 is electrically connected to the third data line DL3, and the fourth pixel structure P4 is electrically connected to the fourth data line DL4. Namely, in the present embodiment, the source S3 of the active component T3 and the third data line DL3 are a continuous conductive pattern, and the source S4 of the active component T4 and the fourth data line DL4 are a continuous conductive pattern.

Moreover, in the present embodiment, the capacitor electrode CE3 of the third pixel structure P3 includes a capacitor electrode portion CE3c and a capacitor electrode portion CE3d, where the capacitor electrode portion CE3c and the capacitor electrode portion CE3d are respectively configured at two sides of the third data line DL3. In detail, since the capacitor electrode CE3 and the third data line DL3 belong to the same layer, the capacitor electrode portions CE3c-CE3d of the capacitor electrode CE3 cannot be directly connected to each other.

The capacitor electrode CE4 of the fourth pixel structure P4 includes a capacitor electrode portion CE4h, a capacitor electrode portion CE4i, a capacitor electrode portion CE4j and a capacitor electrode portion CE4k, where the capacitor electrode portion CE4h and the capacitor electrode portion CE4i are respectively disposed at two sides of the fourth data line DL4, the capacitor electrode portion CE4i and the capacitor electrode portion CE4j are respectively disposed at two sides of the third data line DL3, the capacitor electrode portion CE4j and the capacitor electrode portion CE4k are respectively disposed at two sides of the second data line DL2. In detail, since the capacitor electrode CE4 and the second data line DL2, the third data line DL3 and the fourth data line DL4 belong to the same layer, the capacitor electrode portions CE4h-CE4k of the capacitor electrode CE4 cannot be directly connected to each other.

Moreover, in the present embodiment, the common electrode pattern CM5 of the common electrode layer 130 corresponds to the capacitor electrode CE1 of the first pixel structure P1 and the capacitor electrode portion CE4k of the fourth pixel structure P4; the common electrode pattern CM6 of the common electrode layer 130 corresponds to the capacitor electrode CE2 of the second pixel structure P2, the capacitor electrode CE3d of the third pixel structure P3, and the capacitor electrode portion CE4j of the fourth pixel structure P4; the common electrode pattern CM7 of the common electrode layer 130 corresponds to the capacitor electrode CE3c of the third pixel structure P3 and the capacitor electrode portion CE4i of the fourth pixel structure P4; and the common electrode pattern CM8 of the common electrode layer 130 corresponds to the capacitor electrode CE4h of the fourth pixel structure P4.

Therefore, in the present embodiment, in order to make the third pixel structure P3 to have a proper storage capacitor area, the reflective pixel electrode PE3 of the third pixel structure P3 is electrically connected to the capacitor electrode portion CE3c and the capacitor electrode portion CE3d respectively through a contact hole H3c and a contact hole H3d, such that the capacitor electrode portion CE3c and the common electrode pattern CM7 of the common electrode layer 130 construct a storage capacitor Cst3c, and the capacitor electrode portion CE3d and the common electrode pattern CM6 of the common electrode layer 130 construct a storage capacitor Cst3d. The contact hole H3c is disposed in the cover layer BP and the insulation layer PV to expose the capacitor electrode portion CE3c, and the contact hole H3d is disposed in the cover layer BP and the insulation layer PV to expose the capacitor electrode portion CE3d.

In order to make the fourth pixel structure P4 to have a proper storage capacitor area, the reflective pixel electrode PE4 of the fourth pixel structure P4 is electrically connected to the capacitor electrode portion CE4h, the capacitor electrode portion CE4i, the capacitor electrode portion CE4j and the capacitor electrode portion CE4k respectively through a contact hole H4h, a contact hole H4i, a contact hole H4j and a contact hole H4k, such that the capacitor electrode portion CE4h and the common electrode pattern CM8 of the common electrode layer 130 construct a storage capacitor Cst4h; the capacitor electrode portion CE4i and the common electrode pattern CM7 of the common electrode layer 130 construct a storage capacitor Cst4i; the capacitor electrode portion CE4j and the common electrode pattern CM6 of the common electrode layer 130 construct a storage capacitor Cst4j; and the capacitor electrode portion CE4k and the common electrode pattern CM5 of the common electrode layer 130 construct a storage capacitor Cst4k. The contact hole H4h is disposed in the cover layer BP and the insulation layer PV to expose the capacitor electrode portion CE4h, the contact hole H4i is disposed in the cover layer BP and the insulation layer PV to expose the capacitor electrode portion CE4i, the contact hole H4j is disposed in the cover layer BP and the insulation layer PV to expose a part of the capacitor electrode portion CE4j, and the contact hole H4k is disposed in the cover layer BP and the insulation layer PV to expose a part of the capacitor electrode portion CE4k.

According to the fifth embodiment and the seventh embodiment, it is known that although a configuration structure of the third pixel structure P3 and the fourth pixel structure P4 of the reflective liquid crystal display panel 60 is different from that of the third pixel structure P3 and the fourth pixel structure P4 of the reflective liquid crystal display panel 40, since the pixel unit U also at least includes the first pixel structure P1, the second pixel structure P2, the third pixel structure P3 and the fourth pixel structure P4 with the reflective area ratio of 1:2:4:8, the reflective liquid crystal display panel 60 may at least display 16 gray scale levels to achieve a good visual effect. Moreover, similarly, as the area ratio of the reflective pixel electrode PE1 of the first pixel structure P1, the reflective pixel electrode PE2 of the second pixel structure P2, the reflective pixel electrode PE3 of the third pixel structure P3, and the reflective pixel electrode PE4 of the fourth pixel structure P4 is 1:1:2:4, and the capacitor electrode CE1 and the common electrode pattern CM1 respectively have the same areas as those of the capacitor electrode CE2 and the common electrode pattern CM2, the reflective liquid crystal display panel 60 with the problem of abnormal image display caused by an excessively small storage capacitor area can be avoided, such that a good image display effect is achieved. Moreover, similarly, since in the reflective liquid crystal display panel 60, only one data line DL is adopted in each of the pixel units U to simultaneously drive four active components T1-T4, and the multiplexer 460 is configured to decrease the number of lines used for transmitting the driving signal, the manufacturing cost thereof can be effectively decreased.

Moreover, based on the first embodiment, the second embodiment and the seventh embodiment, it is known that the reflective liquid crystal display panel 60 may be adopted the same design concept to configure the spacer PS for covering a part of the reflective pixel electrode PE2 (not shown) to replace the original design of the seventh embodiment where the spacer PS is configured to cover a part of the reflective pixel electrode PE1, so as to achieve the effect that the pixel unit U at least includes the first pixel structure P1, the second pixel structure P2, the third pixel structure P3 and the fourth pixel structure P4 with the actual reflection area ratio of 2:1:4:8. Alternatively, a light-shielding pattern (not shown) can be adopted to replace the aforementioned spacer PS to achieve the same invention effect. Other design conditions are the same with that of the seventh embodiment, and detail thereof is not repeated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A reflective liquid crystal display panel, having a display area and a periphery area surrounding the display area, and comprising a plurality of pixel units disposed in the display area, wherein each of the pixel units comprises:
   a first substrate;
   one first signal line and four second signal lines, disposed on the first substrate;
   a first pixel structure, a second pixel structure, a third pixel structure and a fourth pixel structure, electrically connected to one of the four second signal lines respectively and electrically connected to the first signal line, wherein the first pixel structure, the second pixel structure, the third pixel structure and the fourth pixel structure respectively comprise:
      an active component; and
      a reflective pixel electrode, electrically connected to the active component, wherein an area ratio of the reflective pixel electrode of the first pixel structure, the reflective pixel electrode of the second pixel structure, the reflective pixel electrode of the third pixel structure and the reflective pixel electrode of the fourth pixel structure is 1:1:2:4, wherein the first signal line is a scan line, and the four second signal lines are data lines;
   a second substrate, located opposite to the first substrate; and
   a liquid crystal layer, disposed between the first substrate and the second substrate, wherein each of the pixel units further comprises a spacer disposed between the first substrate and the second substrate and covering a part of the reflective pixel electrode of the first pixel structure, and a reflection area ratio of the first pixel structure, the second pixel structure, the third pixel structure and the fourth pixel structure is 1:2:4:8.

2. The reflective liquid crystal display panel as claimed in claim 1, wherein the data lines comprise a first data line, a second data line, a third data line and a fourth data line, and the first pixel structure is electrically connected to the first signal line, the second pixel structure is electrically connected to the second signal line, the third pixel structure is electrically connected to the fourth signal line, and the fourth pixel structure is electrically connected to the third signal line.

3. The reflective liquid crystal display panel as claimed in claim 1, wherein the signal lines comprise a first signal line, a second signal line, a third signal line and a fourth signal line, and the first pixel structure is electrically connected to the first signal line, the second pixel structure is electrically connected to the second signal line, the third pixel structure is electrically connected to the third signal line, and the fourth pixel structure is electrically connected to the fourth signal line.

4. The reflective liquid crystal display panel as claimed in claim 1, wherein an area ratio of the spacer, the reflective pixel electrode of the first pixel structure, the reflective pixel electrode of the second pixel structure, the reflective pixel electrode of the third pixel structure and the reflective pixel electrode of the fourth pixel structure is 0.5:1:1:2:4.

5. The reflective liquid crystal display panel as claimed in claim 1, further comprising a plurality of multiplexers disposed in the periphery area, wherein the four second signal lines in each of the pixel units are electrically connected to one of the plurality of multiplexers.

6. A reflective liquid crystal display panel, having a display area and a periphery area surrounding the display area, and comprising a plurality of pixel units disposed in the display area, wherein each of the pixel units comprises:
   a first substrate;
   one first signal line and four second signal lines, disposed on the first substrate;
   a first pixel structure, a second pixel structure, a third pixel structure and a fourth pixel structure, electrically connected to one of the four second signal lines respectively and electrically connected to the first signal line, wherein the first pixel structure, the second pixel structure, the third pixel structure and the fourth pixel structure respectively comprise:
      an active component; and
      a reflective pixel electrode, electrically connected to the active component, wherein an area ratio of the reflective pixel electrode of the first pixel structure, the reflective pixel electrode of the second pixel structure, the reflective pixel electrode of the third pixel structure and the reflective pixel electrode of the fourth pixel structure is 1:1:2:4, wherein the first signal line is a scan line, and the four second signal lines are data lines,
   a second substrate, located opposite to the first substrate; and
   a liquid crystal layer, disposed between the first substrate and the second substrate, wherein each of the pixel units further comprises a light-shielding pattern disposed on the first substrate or the second substrate and shielding a part of the reflective pixel electrode of the first pixel structure along a vertical projection direction of the second substrate, and a reflection area ratio of the first pixel structure, the second pixel structure, the third pixel structure and the fourth pixel structure is 1:2:4:8.

7. The reflective liquid crystal display panel as claimed in claim 6, wherein an area ratio of the light-shielding pattern, the reflective pixel electrode of the first pixel structure, the reflective pixel electrode of the second pixel structure, the reflective pixel electrode of the third pixel structure and the reflective pixel electrode of the fourth pixel structure is 0.5:1:1:2:4.

* * * * *